J. B. DAVIS.
FISHING FLOAT.
APPLICATION FILED JULY 13, 1918.
1,278,312.
Patented Sept. 10, 1918.
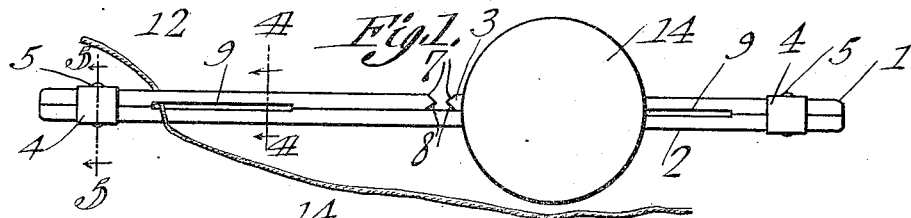
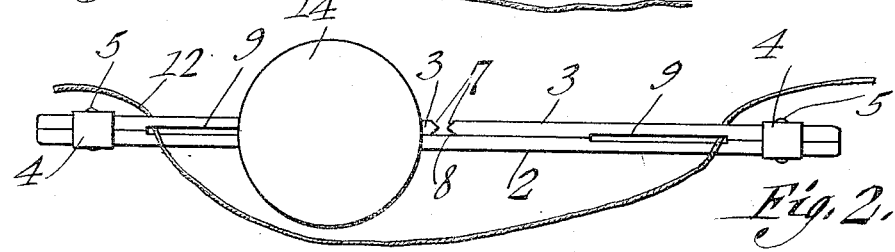
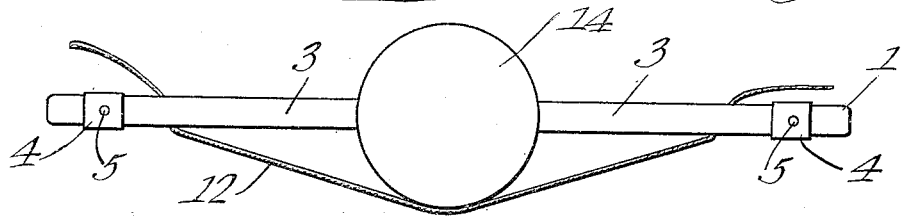
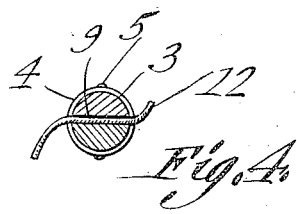
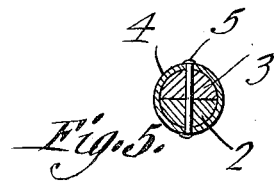
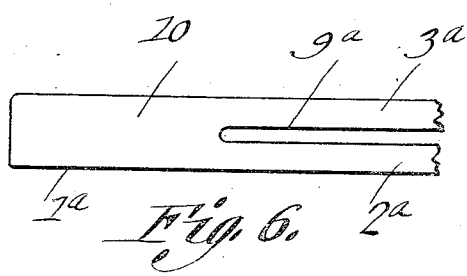
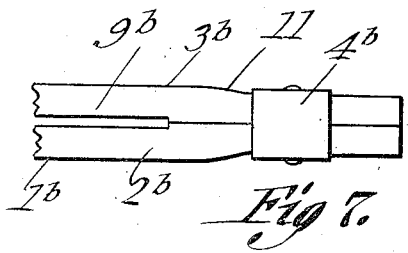
J. B. Davis, Inventor
Witness
By Attorneys

UNITED STATES PATENT OFFICE.

JAMES B. DAVIS, OF BRADY, TEXAS.

FISHING-FLOAT.

1,278,312.

Specification of Letters Patent.  Patented Sept. 10, 1918.

Application filed July 13, 1918. Serial No. 244,774.

*To all whom it may concern:*

Be it known that I, JAMES B. DAVIS, a citizen of the United States, residing at Brady, in the county of McCulloch and State of Texas, have invented a new and useful Fishing-Float, of which the following is a specification.

The device forming the subject matter of this application is a fishing float, and the invention aims to provide a device of the class mentioned wherein the staff and the buoyant body of the float coöperate in a novel way to hold a line.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figures 1 and 2 are side elevations of a fishing float embodying the invention, the views illustrating different steps in the process of mounting the line in the float;

Fig. 3 is an elevation wherein the structure is viewed at right angles to the showing of Figs. 1 and 2, the line being in place;

Fig. 4 is a cross section on the line 4—4 of Fig. 1;

Fig. 5 is a cross section on the line 5—5 of Fig. 1;

Fig. 6 is a fragmental side elevation showing a modification; and

Fig. 7 is a fragmental side elevation showing a further modification.

Referring to Figs. 1 to 5, both inclusive, the float is disclosed as comprising a staff, denoted generally by the numeral 1 and including a main member 2. Tongues 3 extend longitudinally of the staff 1, the outer ends of the tongues being secured to the outer ends of the staff 1 by means of circumscribing bands 4, held in place by securing devices 5 engaging the main member 2 and the tongues 3, as disclosed best in Fig. 5. The tongues 3 are somewhat resilient so that their inner ends may be sprung outwardly, away from the main member 2, to permit the insertion of a line 12 between the tongues and the main member. The inner ends of the tongues 3 are beveled externally as shown at 7, and are beveled internally, as shown at 8 to facilitate the insertion of the line 12 between the main member 1 and the tongues 3. Near to the outer ends of the staff 1, the tongues 3 and the main member 2 are cut away upon their inner faces to form recesses 9 in which the line 12 is received and held, the outer ends of the main member 2 and the tongues 3 being in close contact as shown in Fig. 5, and the inner ends of the tongues 3 bearing on the main member 2, as desclosed in Figs. 1 and 2. A buoyant body 14, of any desired form, is mounted to slide on the staff 1, longitudinally of the staff. The body 14 may be pushed along the staff 1, by hand, but has sufficient friction hold on the staff, so that it will not slide thereon too readily.

In practical operation, the body 14 may be slid to the right (Fig. 1) in order to set the inner end of the left hand tongue 3 free. One end of the line 12 is entered between the left hand tongue 3 and the main member 2 through the beveled parts 7 and 8, and is received and clamped in the left hand recess 9. The body 14 is then slid to the left, into the position of Fig. 2 to set the right hand tongue 3 free, and in this connection, it is to be noted that since the main member 2 and the tongues 3 are recessed as shown at 9, the tongues will not be held apart from the main member, by the line 12. Therefore, the body 14 may slide readily from one of the tongues 3, upon the other tongue, as shown in Fig. 2. The line is passed between the right hand tongue 3 and the main member 2 and is slid into the right hand recess 9, as depicted in Fig. 2. The line may then be drawn as taut as possible, the body subsequently being slid to the right into the position of Fig. 3 so as to house the inner ends of both of the tongues 3. The body 14, when arranged as shown in Fig. 3, holds the tongues 3 in gripping relation upon the line 12.

In Fig. 6 of the drawings, the bands 4 have been omitted, the tongues 3ª being connected with the main member 2ª by means of an integral head 10. In Fig. 6 parts hereinbefore described have been designated by numerals previously used, with the suffix "a".

In Fig. 7, wherein another modification is shown, parts hereinbefore described have been designated by numerals previously used, with the suffix "b". In this form of the invention, the tongues 3ᵇ are held on the part 2ᵇ by bands 4ᵇ, the tongues and the main members 2ᵇ being tapered, as shown at 11, so that the bands 4ᵇ may be held in place by a wedging action.

Having thus described the invention, what is claimed is:—

1. A fishing float comprising a staff including a main member and tongues having their outer ends fixed with respect to the main member, the inner ends of the tongues being free; and a body surrounding the staff, the body being slidable on either tongues to set the inner end of the other tongue free, and being slidable to house inner ends of both tongues.

2. A fishing float constructed as set forth in claim 1, and further characterized by the fact that the inner ends of the tongues are beveled transversely, both internally and externally.

In testimony that I claim the foregoing as my own, I have hereto affixed my signature in the presence of two witnesses.

JAMES B. DAVIS.

Witnesses:
W. W. WALKER,
S. J. STRIEGLER.

Copies of this patent may be obtained for five cents each, by addressing the "Commissioner of Patents, Washington, D. C."